United States Patent [19]

Kimura et al.

[11] Patent Number: 5,871,418

[45] Date of Patent: Feb. 16, 1999

[54] SHIFT CONTROL APPARATUS IN VEHICLE AUTOMATIC TRANSMISSION

[75] Inventors: Fuyumi Kimura, Chiryu; Yutaka Ito, Nagoya; Nobuyuki Okada, Anjo; Hiroyuki Nishizawa, Tajimi, all of Japan

[73] Assignee: Aisin Seiki Kabushiki Kaisha, Kariya, Japan

[21] Appl. No.: 831,493

[22] Filed: Mar. 31, 1997

[30] Foreign Application Priority Data

Mar. 29, 1996 [JP] Japan .................................. 8-077093

[51] Int. Cl.⁶ .................................................. F16H 61/08
[52] U.S. Cl. ............................ 477/148; 477/63; 477/143; 477/156
[58] Field of Search .................................. 477/61, 62, 63, 477/143, 144, 148–149, 155, 156

[56] References Cited

U.S. PATENT DOCUMENTS

| | | | |
|---|---|---|---|
| 5,038,636 | 8/1991 | Vukovich et al. | 477/148 |
| 5,063,814 | 11/1991 | Baba et al. | 477/155 X |
| 5,133,231 | 7/1992 | Goto et al. | 477/143 X |
| 5,292,288 | 3/1994 | Kashiwabara et al. | 477/61 X |
| 5,460,583 | 10/1995 | Kitada et al. | 477/148 X |
| 5,634,869 | 6/1997 | Mikami et al. | 477/154 |
| 5,653,660 | 8/1997 | Tsukamoto et al. | 477/143 |
| 5,667,458 | 9/1997 | Narita et al. | 477/62 X |

FOREIGN PATENT DOCUMENTS 6-11031  1/1994  Japan .

*Primary Examiner*—Dirk Wright
*Assistant Examiner*—Peter T. Kwon
*Attorney, Agent, or Firm*—Burns, Doane, Swecker & Mathis, LLP

[57] ABSTRACT

A shift control apparatus in a vehicle automatic transmission, where down-shift is carried out from a high velocity step to a low- velocity step.

A flatness-aiming control has a common targetted change rate with respect to a turbine rotational speed in the inertia phase, and aims a hydraulic command value for the engaging side element and a hydraulic command value for the releasing side element at flatness in the inertia phase with the passage of time.

An initial value setting control sets an engaging side initial value and a releasing side initial value at the beginning of the inertia phase in response to the turbine torque and the turbine rotational speed.

8 Claims, 8 Drawing Sheets

|  |  | CLUTCH | | BRAKE | | | SOLENOID VALVE | | |
|---|---|---|---|---|---|---|---|---|---|
|  |  | C1 | C2 | B0 | B1 | B2 | NO.1 | NO.2 | NO.3 |
| P |  |  |  |  |  |  |  |  |  |
| R |  | ○ |  |  |  |  | × | ○ | × |
|  |  | ○ |  |  |  | ○ | × | × | × |
| N |  | ○ |  |  |  |  |  |  |  |
| D | 1 | ○ |  |  | ○ |  | × | ○ | ○ |
|  | 2 |  | ○ |  | ○ |  | ○ | × | ○ |
|  | 3 | ○ | ○ |  |  |  | × | × | × |
|  | 4 |  | ○ | ○ |  |  | ○ | × | × |

(POWER-ON)

SHIFT CONTROL APPARATUS IN VEHICLE AUTOMATIC TRANSMISSION

BACKGROUND OF THE INVENTION

Field of the Invention

The present invention relates to a shift control apparatus in a vehicle automatic transmission.

DESCRIPTION OF RELATED ART

Generally, an automatic transmission in a vehicle has a plurality of frictional engaging elements (clutches and brakes). These frictional engaging elements are operated for engagement and for release to shift a speed of vehicle.

For example, when down-shift from a high velocity step to a low velocity step is carried out, frictional engaging elements being engaged in the high velocity step is released, and frictional engaging elements to be engaged to the low velocity step is newly engaged; so, the frictional engaging elements change to carry out down-shift.

The former for releasing engagement is a releasing side element of the frictional engaging elements. The latter for engaging newly is an engaging side element of the frictional engaging elements. A timing for changing frictional engaging elements is very important for shifting gears.

FIG. 9(1) shows some changed states of a turbine rotational speed in down-shift. As understood from FIG. 9(1), a turbine rotational speed is indicated at V1 when the releasing side element of frictional engaging elements in the high velocity step is engaged. Also, a turbine rotational speed is indicated at V2 when the engaging side element of frictional engaging elements in the slow velocity step is engaged. When down-shift from the high velocity to the low velocity step, a turbine rotational speed is increased by one rate from V1 to V2 by way of an inertia phase YB.

Conventionally, when down-shift is carried out in a power-on state in which an accelerator pedal is depressed in large and in which an engine torque is sufficiently generated, only releasing the releasing side element of frictional engaging elements and sliding the engaging side element of frictional engaging elements, which allows a turbine rotational speed to increase, thereby carrying out down-shift.

However, when down-shift is carried out in a power-on state in which the accelerator pedal isn't depressed and the engine torque isn't sufficiently generated, the engaging motion of the engaging side element of frictional engaging elements is controlled in such a manner that the engaging side element of the frictional engaging elements is engaged in its early stage. Because the low velocity step can increase the turbine rotational speed than the high velocity step as can be appreciated from FIG. 9(1).

Namely, in the conventional technique, the control regulation (the control program) is different between the power-on state and the power-off state. Thus, when the power-on state is judged, the control regulation for the power-on state is carried out. Conversely, when the power-off state is judged, the control regulation for the power-off state is carried out. In such a way, the control regulation is changed as occasion may demand between the power-in state and the power-off state.

However, it is not preferable that the control regulation differs between the power-on state and the power-off state. After controller begins to carry out down-shift in the power-on state, the power-on state is converted into the power-off state, also, after the controller begins to carry out down-shift in the power-off state, the power-off state is converted into the power-on state, coordination in the control regulation isn't kept. This sometimes causes shift- incompatibility, shift- shack, and "rotational blow".

In order to solve such a problem, Japanese Unexamined Patent Publication (KOKAI) 6-11,031 discloses a technique in which a common control regulation is carried out without distinguishing the power-on state and the power-off state. In this technique, there is a difference between a targetted change rate S1, with respect to the turbine rotational speed corresponding to the releasing side element of frictional engaging elements in the inertia phase YB, and a targetted change rate S2, with respect to the turbine rotational speed corresponding to the engaging side element of frictional engaging elements in the inertia phase YB. Thus, the common regulation is carried out without distinguishing the power-on state and the power-off state. This publication technique can advantageously solve the aforementioned problem resulting from the change between the power-on state and the power-off state.

This publication technique set the targetted change rate S2, corresponding to the engaging side element of frictional engaging elements, lower than the targetted change rate S1, corresponding to the releasing side element of frictional engaging elements.

SUMMARY OF THE INVENTION

In the power-on state in which the accelerator pedal is depressed, the turbine rotational speed has a tendency to increase. So, a timing chart of FIG. 9(1) shows that an actual change rate Sx of the turbine rotational speed in the inertia phase YB is over the targetted change rate S2 and S1. Therefore, it is preferable that the releasing side element of frictional engaging elements is delayed for release so as to suppress the turbine rotational speed forcibly, when down-shift is carried out in the power-on state. Because, as appreciated from FIG. 9(1), engagement of the releasing side element of frictional engaging elements in the high velocity step can decrease the turbine rotational speed than engagement of the engaging side element of frictional engaging elements in the low velocity step.

On the other hand, in the power-off state in which the accelerator pedal isn't depressed, as appreciated from FIG. 10(1), the turbine rotational speed has a tendency to decrease. So, a timing chart of FIG. 10(1) shows that the actual change rate SY of turbine rotational speed is under the targetted change rates S2 and S1. Therefore, when down-shift is carried out in the power-off state, it is preferable that the engaging side element of frictional engaging elements quickens to be engaged and the turbine rotational speed is forcibly increased. Because engagement of the engaging side element of frictional engaging elements in the low velocity step can increase the turbine rotational speed than engagement of the releasing side element of frictional engaging elements in the low velocity step, as appreciated from FIG. 10(1).

In view of the aforementioned matter, as shown in FIGS. 9(1) and 10(1), when down-shift is carried out, the targetted change rate S2 of the engaging side element of frictional engaging elements is smaller than the targetted change rate S1 of the releasing side element of frictional engaging elements (S2<S1).

In the opinion of the present inventors, when S2<S1 is set as mentioned above, the following control would be carried out, and there might arise the following problem.

Namely, as shown in FIG. 9(1), when a shifting command is outputted at Time e so as to carry out down-shift in the power-on state, the actual change rate Sx of turbine rotational speed in the inertia phase YB is larger than the targetted change rates S1 and S2; therefore a hydraulic command value of hydraulic pressure of the releasing side element, which is for releasing the releasing side element, transforms to exhibit a characteristic line Al in FIG. 9(2). Namely, in the torque phase YA in the range of from Time e to Time h, a hydraulic command value of the releasing side element is set to the full releasing value AO.

At Time h, at the beginning of the inertia phase YB, the hydraulic command value is set at a middle value AN. At Time k, at the finishing of the inertia YB, a hydraulic command value is again set to the full releasing value AO.

On the other hand, the hydraulic command value of hydraulic pressure of the engaging side element, which is for engaging the engaging side element of frictional engaging elements, transforms to exhibit a characteristic line A2 in FIG. 9(3). Namely, from Time e to Time f, the hydraulic command value of engaging side element is set to the full supplying value AF. At Time f, the hydraulic command value is set at a middle value AM. At Time k, at the finishing of the inertia phase YA, the hydraulic command value is again set to the full supplying value AF.

Figure 10:
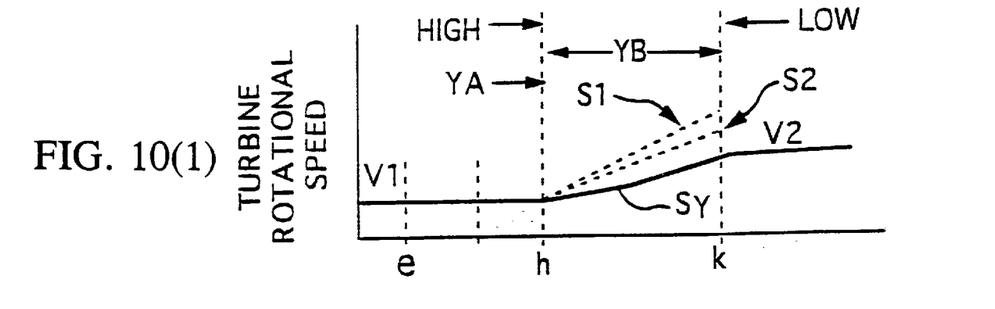

As shown in FIG. 10 exhibiting the power-off state, in the inertia phase YA, the actual change rate SY of turbine rotational speed is smaller than the targetted change rates S1 and S2. In such a case, when down-shift is carried out, the hydraulic command value of releasing side element, which is for releasing the releasing side element of frictional engaging elements, transforms to exhibit a characteristic line B1 in FIG. 10(2). Namely, the hydraulic command value is set from the full supplying value BF, to the full releasing value BO, to the middle value BN, . . . , and to the full releasing value BO.

On the other hand, the hydraulic command value of engaging side element, which is for engaging the engaging side element of frictional engaging elements, transforms to exhibit a characteristic line B2 in FIG. 10(3). Namely, the hydraulic command value is set from the full releasing value BO, to the full supplying value BF, to the middle value BM, and to the full supplying value BF.

In the aforementioned control, when down- shift is carried out in the power-on state, as appreciated from FIG. 9(3), the hydraulic command value for engaging the engaging side element is advanced to the full supplying value AF at Time k so as to work originally. As shown at Aa of the characteristic line A2 in FIG. 9(3), however, the hydraulic command value of engaging side element sometimes has a tendency to continue going toward to the releasing direction at the closing period of the inertia phase YA.

The reason is as follows: In the power-on state having a tendency for the turbine rotational speed to increase, it is preferable to suppress the turbine rotational speed. Thus, the turbine rotational speed is suppressed by the engagement of the releasing side element of frictional engaging elements in high velocity step. In view of such, it is preferable that the releasing side element of frictional engaging elements is released with delay and the engaging side element of frictional engaging elements in the low velocity step is engaged with delay.

In this respect, according to the aforementioned control, when down-shift is carried out in the power-on state, since the hydraulic pressure of the releasing side element has a tendency to continue going toward the releasing direction, there might arise "a rotational blow", as shown at "AA" in FIG. 9(1).

The present invention has been developed in view of the aforementioned circumstances. It is an object of the present invention to provide a shift control apparatus in a vehicle automatic transmission which can control down-shift by use of the same control regulation without distinguishing between a power-on state and a power-off state, which can suppress a hydraulic pressure of engaging side element from continuing to go toward the releasing direction when down-shift carried out in a power-on state, and which can advantageously suppress "a rotational blow".

In the present invention, a shift control apparatus in a vehicle automatic transmission, wherein an engaging side element of frictional engaging elements is engaged to become a low- velocity step by a hydraulic pressure of the engaging side element, while a releasing side element of frictional engaging elements engaged in a high velocity step is released by a hydraulic pressure of the releasing side element, so as to carry out down-shift in such a manner that a turbine rotational speed increases to generate an inertia phase, and the apparatus comprises:

a flatness-aiming means having a common targetted change rate with respect to the turbine rotational speed in the inertia phase, the common targetted change rate being targetted in the engaging side element of frictional engaging elements and in the releasing side element of the frictional engaging elements, for feed-back controlling the releasing side element and the engaging side element of frictional engaging elements in such a target that motion of the engaging side element of frictional engaging elements and motion of the releasing side element of frictional engaging elements in the inertia phase adapt to the common targetted change rate, and for aiming a hydraulic command value of the engaging side element and a hydraulic command value of the releasing side element at flatness in the inertia phase with the passage of time; and an initial value setting means for setting an engaging side initial value and a releasing side initial value in the inertia phase, in response to a physical amount about a turbine torque and in response to a physical amount about turbine rotational speed, wherein the engaging side initial value is the hydraulic command value for moving the engaging side element of frictional engaging elements, and wherein the releasing side initial value is the hydraulic command value for moving the releasing side element of frictional engaging elements.

According to the apparatus of the present invention, in down-shift, the apparatus can carry out a common regulation (a common program) without distinguishing between a power-on state and a power-off state.

Also, according to the apparatus of the present invention, in down-shift, the apparatus can advantageously prevent that the hydraulic pressure continues to go toward the releasing direction at the closing period of the inertia phase as distinct from Japanese Unexamined Publication (KOKAI) 6-11,031 . Therefore, the apparatus can previously prevent "a rotational blow", resulting from the fact that an engaging hydraulic pressure continues to go toward the releasing direction at the closing period of the inertia phase.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure:

FIGS. 4(1)–4(4) are timing charts to carry out down-shift in a power-on state;

FIGS. 5(1)–5(3) are timing charts to carry out down-shift in a power-off state;

FIGS. 9(1)–9(3) are timing charts of a technique to carry out down-shift in a power-on state; and FIGS. 10(1)–10(3) are timing charts of the technique to carry out down-shift in a power-off state.

DETAILED DESCRIPTION OF THE PREFERRED EMBODIMENT

Having generally described the present invention, a further understanding can be obtained by reference to the specific preferred embodiment which are provided herein for purpose of illustration only and are not intended to limit the scope of the appended claims.

A preferred Embodiment of a shift control apparatus in a vehicle automatic transmission to the present invention will be hereinafter described with reference to Figures.

(1) Basic Construction

Figure 1:
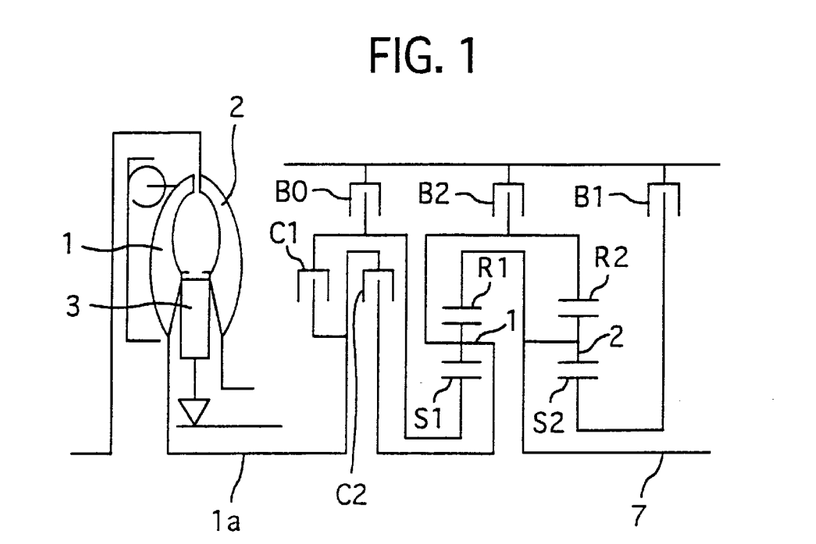
FIG. 1 is a skeleton diagram which shows a shift control apparatus in a vehicle automatic transmission.

FIG. 1 shows a skeleton diagram of the shift control apparatus in a vehicle automatic transmission. In FIG. 1, 1 indicates a turbine, $1a$ indicates a turbine shaft, 2 indicates a pump, 3 indicates a stator. There are clutches C1, C2 working as frictional engaging elements, and brakes B0,B1, B2 working as frictional engaging elements. There are ring-gears R1,R2, sun-gears S1,S2, and carriers E1,E2.

Figure 2:
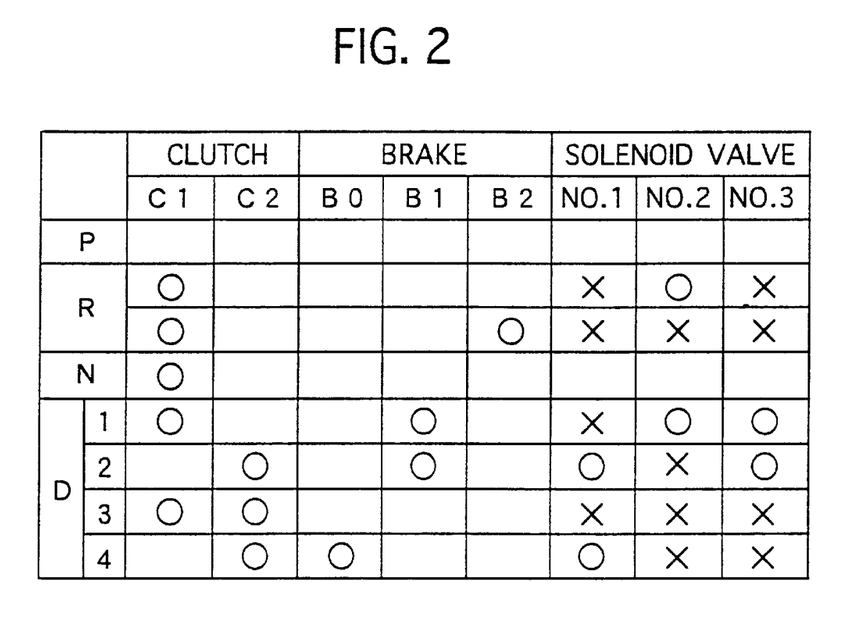
FIG. 2 is an operational table of the shift control apparatus in a vehicle automatic transmission.

FIG. 2 shows an example of operating table in the aforementioned shifting controller. A "603" mark means that a frictional engaging element is in an engaged condition, and markless means that the frictional engaging element is in a released condition. FIG. 2 shows that the clutch C1 is engaged and the brake B1 is engaged in the range D1, it shows that the clutch C2 is engaged and the brake B1 is engaged in the range D2, and it shows that the clutch C1 is engaged and the clutch C2 is engaged in the range D3.

As appreciated from FIG. 2, when the down-shift is carried out from the range D2 in the high velocity step to the range D1 in the low velocity step, the clutch C2 is released and the clutch C1 is engaged, while the brake B1 is engaged. In such a case, the clutch C2 works as the releasing side element of frictional engaging elements, and the clutch C1 works as the engaging side element of frictional engaging elements.

Further, as appreciated from FIG. 2, when the down-shift carried out from the range D3 in the high velocity step to the range D2 in the low velocity step, the clutch C1 is released and the brake B1 is engaged, while the clutch C2 is engaged. In such a case, the clutch C1 works as the releasing side element of frictional engaging elements, and the brake B1 works as the engaging side element of frictional engaging elements.

Still further, as appreciated from FIG. 2, when the down-shift is carried out from the range D4 in the high velocity step to the range D3 in the low velocity step, the brake B0 is released and the clutch C1 is engaged, while the clutch C2 is engaged. In such a case, the brake B0 works as the releasing side element of frictional engaging elements, and the clutch C1 works as the engaging side element of frictional engaging elements.

Figure 3:
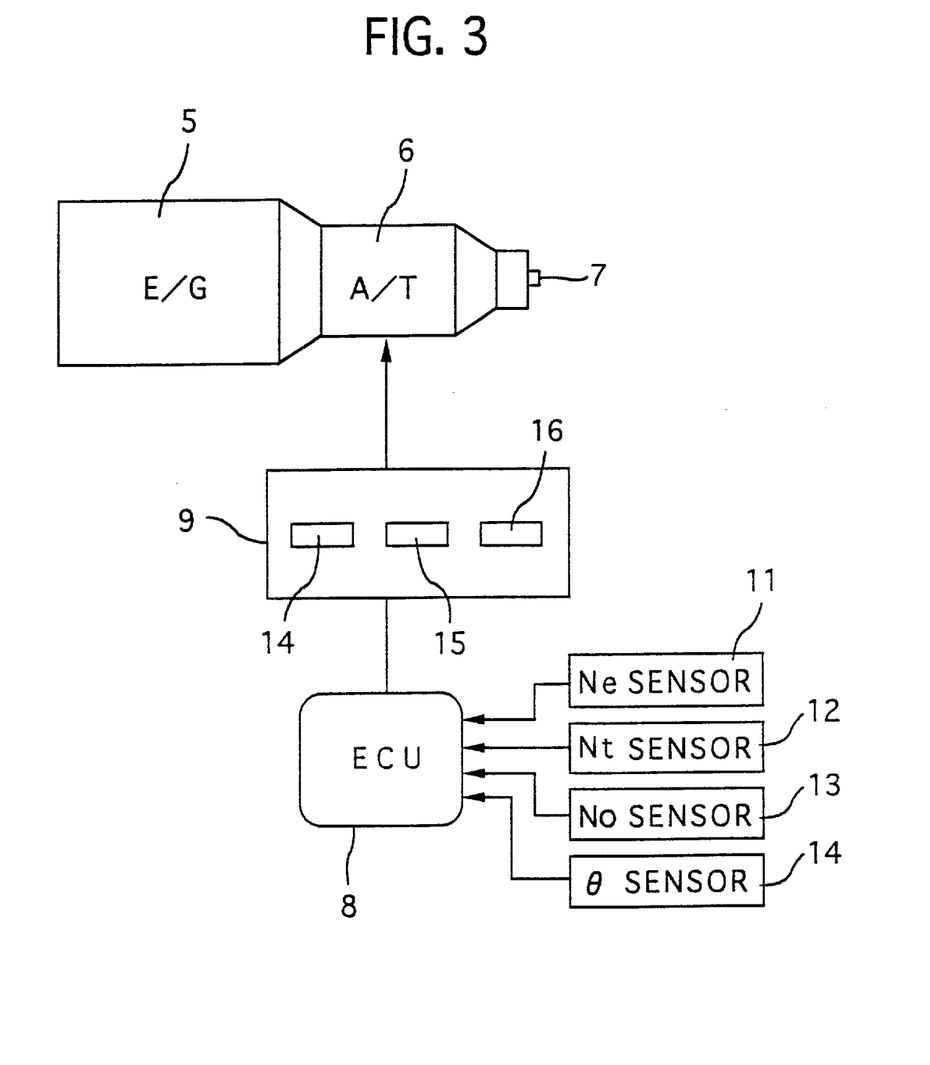
FIG. 3 is a block diagram of the shift control apparatus in the vehicle automatic transmission.

FIG. 3 shows a block diagram of the shifting apparatus and an engine. FIG. 3 shows that a driving force of engine (E/G) is transmitted by way of the shifting apparatus 6. The shifting apparatus 6 is controlled a hydraulic circuit 9 controlled by a controller (ECU) 8. Ne sensor 11 detects a rotational frequency of engine, Nt sensor 12 works as a turbine rotational speed detecting means to detect the rotational frequency of the turbine $1a$ working as an inputting shaft, No sensor 13 detects the rotational frequency of the outputting shaft 7 working as the driving shaft, and θ0 sensor 14 detects a throttle degree of a throttle valve. The signals from these sensor are inputted into the controller 8.

In the hydraulic circuit 9, duty-solenoid valves 14 to 16 (referred to as a solenoid valve hereinafter) are disposed.

In releasing the releasing side element of frictional engaging elements, one of the solenoid valves 14 to 16 generates an releasing hydraulic pressure. In engaging the engaging side element of e frictional engaging elements, the other of solenoid valves 14 to 16 generates an engaging hydraulic pressure.

In other words, on the basis of signals from the aforementioned sensors, the controller 8 outputs hydraulic command values into the duty-solenoid valves 14 to 16 so as to control each of valves independently. Accordingly, the controller 8 controls the hydraulic command value of engaging side element for moving the engaging side element of frictional engaging elements in the engaging directions, and controller 8 controls the hydraulic command value of releasing side element for moving the releasing side element of frictional engaging elements in the releasing directions. The control will be described hereinafter.

(2) Control Mode

The control in down-shift will be described hereinafter.

FIGS. 4(1) to (4) show schematically timing charts in which the down-shift is carried out in the power-on state from the high velocity step (2 step) to the low velocity step (1 step). The horizontal axis of FIG. 4 exhibits time which advances as it approach right ward. The characteristic line X in FIG. 4(1) shows a timing chart of sifting command outputted from the controller 8. The characteristic line A in FIG. 4 shows a rotational frequency of the turbine shaft la. The characteristic line B in FIG. 4 shows a timing chart of hydraulic command value ( duty ratio) for supplying pressure to the releasing side solenoid valve for obtaining the releasing hydraulic pressure. The characteristic line C in FIG. 4 shows a timing chart of hydraulic command value for supplying pressure to the engaging side solenoid valve for obtaining the engaging hydraulic pressure.

FIGS. 5 (1) to (3) show schematically timing charts in which down-shift is carried out in the power-off state from the high velocity step (2 step) to the low velocity step (1 step). The horizontal axis of FIG. 5 exhibits time which advances as it approaches right ward. The characteristic line A in FIG. 5 shows a timing chart of rotational frequency of the turbine shaft $1a$. The characteristic line B in FIG. 5 shows a timing chart of hydraulic command value (duty ratio) for supplying pressure to the releasing side solenoid valve for obtaining the releasing hydraulic pressure. The characteristic line C in FIG. 5 shows a timing chart of hydraulic command value for supplying pressure to the engaging side solenoid valve for obtaining the engaging hydraulic pressure.

Figure 4:
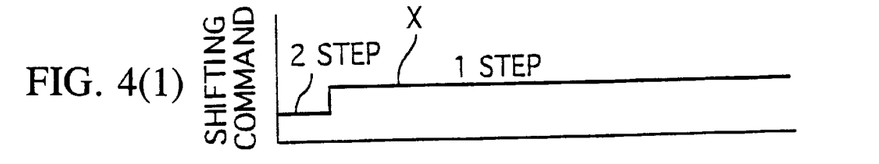
Figure 5:
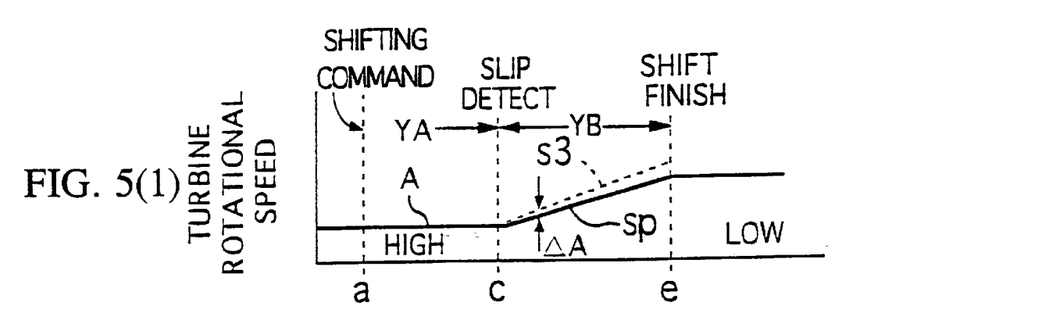

FIGS. 4 and 5 show that down-shift command, for shifting from the high velocity ( 2 step) to the low velocity ( 1 step ), is outputted at Time a. In this case, as shown at the characteristic line A, the turbine rotational speed begins to increase in the inertia phase YB after the torque phase YA. In the finishing of the down-shift, the turbine rotational speed is kept in a steady state. Such is similar to the aforementioned matter.

Down-shift, in the power-on state in which the accelerator pedal is depressed, will be described with reference to FIG. 4.

The following is about the hydraulic pressure of releasing side element for moving the releasing side element of frictional engaging elements. At Time a, the down-shift command is outputted. As shown at Ba of the characteristic line B in FIG. 4(3), the hydraulic command value of the releasing side element changes from the full supplying value UF to the full releasing value UO just before the time from which the inertia phase YB so, the releasing side element of frictional engaging elements is released at the maximum speed.

Thereafter, the turbine rotational speed is changed from the torque phase YA to the inertia phase YB. At the beginning of the inertia phase YB, the hydraulic command value of releasing side element is set at the initial value UH. Further, as shown at Bd of the characteristic line B in FIG. 4(3), in the inertia phase YB, the hydraulic command value of the releasing side element is increased over the full releasing value UO.

Further, at Time e, at the finishing of the inertia phase YB, as shown at Be of the characteristic line B in FIG. 4(3), the hydraulic command value of the releasing side element is set at the full releasing value UO again so as to finish the releasing motion of the releasing side element of frictional engaging elements.

Next, the following is about the hydraulic command value of the engaging side element for moving the engaging side element of frictional engaging elements for engagement. As shown at Ca of the characteristic line C in FIG. 4(4), just before the time from which the inertia phase YB starts, the hydraulic command value of the engaging side element is set from the full releasing value UO to the middle value UX; so, the engaging side element of frictional engaging elements begins to go in the engaging direction for closing a gap of the engaging side element.

After that, the turbine rotational speed changes from the torque phase YA to the inertia phase YB. In the inertia phase YB, as shown at Cd of the characteristic line C in FIG. 4(4), the hydraulic command value is partially reduced. At the finishing of inertia phase YB, Time e, as shown at Ce of the characteristic line C in FIG. 4(4), the hydraulic command value of the engaging side element is set at the full supplying value UF to finish the engaging motion.

Now, in the present embodiment, while inputting the signals from the sensors 11 to 14, the controller 8 controls the hydraulic command value of the engaging side element and the hydraulic command value of the releasing side element on the basis of the common targetted change rate S3 by means of feed- back control, in such a target that the an actual change rate Sp of turbine rotational speed adapts to the common targetted change rate S3.

In the power-on state in which the accelerator pedal is depressed, as shown in FIG. 4(1), an actual changed rate Sp of turbine rotational speed in the inertia phase YB is increased over the targetted change rate S3. Thus, it is required that the turbine rotational speed is suppressed to decrease in the inertia phase YB.

Accordingly, when the turbine rotational speed changes into the inertia phase YB, and when a slip is detected in the releasing side element of frictional engaging elements at Time c, on the basis of the turbine torque at Time c and the turbine rotational speed at Time c, the controller 8 sets the initial value UH of hydraulic command value of the releasing side element in the inertia phase YB, and the controller 8 sets the initial value UL of hydraulic command value of the engaging side element in the inertia phase YB. Time c is corresponding to the finishing of the torque phase YA.

In the inertia phase YB, the controller 8 controls the engaging motion (the engaging hydraulic pressure) of the engaging side element of frictional engaging elements, and the releasing motion (the releasing hydraulic pressure) of the releasing side element of frictional engaging elements, by means of feed-back control; thus, an actual change rate of turbine rotational speed adapts to the common targetted change rate S3.

When the actual change rate of turbine rotational speed adapts to the common targetted change rate S3, namely, when an increasing incline of turbine rotational speed in the inertia phase YB adapts to the common targetted change rate S3, the hydraulic command value of the engaging side element and the hydraulic command value of the releasing side element are kept as they are. Therefore, as shown at Bd of the characteristic B in FIG. 4(3), also as shown at Cd of the characteristic C in FIG. 4(4), the hydraulic command value of the engaging side element and the hydraulic command value of releasing side element are to be flatness with the passage of time. That is to say, Bd of the characteristic line B in FIG. 4, and Cd of the characteristic line C run essentially parallel and essentially flat.

In the present embodiment, as distinct from the technique in Japanese Unexamined Patent Publication (KOKAI) 6-11, 031, namely, as distinct from Aa of the characteristics line A2 in FIG. 9(3), it is preventable that the hydraulic pressure of the engaging side element continues to go toward the releasing direction in the closing period of the inertia phase YB. Thus, "a rotational blow" is previously and advantageously prevented in the turbine rotational speed.

The following is about down-shift in the power-on state in which the accelerator pedal isn't depressed. In the torque phase YA before the inertia phase YB, the hydraulic command value of the engaging side element and hydraulic command value of releasing side element are similar to those of the power-on state shown in FIG. 4. Also, after the inertia phase YB, the hydraulic command value of the engaging side element and hydraulic command value of releasing side element are similar to those of the power-on state shown in FIG. 4.

Namely, there are a difference in the inertia phase YB between the power-off timing chart shown in FIG. 5 and the power-on timing chart shown in FIG. 4.

In the power-off state in which the accelerator pedal isn't depressed, as shown in FIG. 5(1), an actual turbine rotational speed is lower than the common targetted change rate S3. Therefore, it is required that the turbine rotational speed is controlled to increase in the inertia phase YB.

Accordingly, in the present embodiment, when the turbine rotational speed changes into the inertia phase YB, when a slip is detected in the releasing side element of frictional engaging elements at Time c, the controller 8 sets the initial value UH of hydraulic command value of the releasing side element at the beginning of the inertia phase YB, and the controller 8 sets the initial value UL of hydraulic command value of the engaging side element at the beginning of the inertia phase YB, on the basis of the turbine torque and the turbine rotational speed at Time c. This matter is the same as the power-on state.

The controller 8 controls the engaging motion of engaging side element of frictional engaging elements and the releasing motion of releasing side element of frictional engaging elements by means of feed-back control. Thus, an actual change rate of turbine rotational speed adapts to the common targetted change rate S3. Also, this matter is the same as the power-on state.

When the actual change rate of turbine rotational speed adapts to the common targetted change rate S3, the hydraulic command value of the engaging side element and the hydraulic command value of the releasing side element are essentially kept as they are. Therefore, as shown at Bd of the characteristic line B in FIG. 5, also as shown at Cd of the characteristic line C in FIG. 5, the hydraulic command value of the engaging side element and the hydraulic command value of the releasing side element are to be flatness with the passage of time. That is to say, Bd of the characteristic line B in FIG. 5 and Cd of the characteristic line C run essentially parallel and essentially flat with they advancing rightwards.

As mentioned above, in the present embodiment, the initial value UH of hydraulic command value of the releasing side element at the beginning of the inertia phase YB, and the initial value UL of hydraulic command value of the engaging side element at the beginning of the inertia phase YB, which are set in view of the turbine torque and the turbine rotational speed.

Concretely, UH (duty ratio) is decided on the basis of the following mathematical formula (1), and UL (duty ratio) is decided on the basis of the following mathematical formula (2).

$$UH = aH + (bH \times |Tt|) + (cH \times \omega t) \quad (1)$$

$$UL = aL + (bL \times |Tt|) + (cL \times \omega t) \quad (2)$$

where aH,bH,cH,aL,bL,,cL mean constant coefficients, $\omega t$ means a turbine rotational speed, and Tt means a turbine torque estimated value (if possible, a measured value is usable).

In the mathematical formulas (1)(2), aL,bL mean off-set values. (bH×|Tt|) and (bL×|Tt|) mean terms for designating the hydraulic command value in such a manner that a pressing force of the frictional engaging elements is generated in accordance with a torque converter transmitting torque. ( cH×$\omega t$) and ( cL×$\omega t$) mean centrifugal pressure-correcting terms for correcting the pressing force change resulting from centrifugal pressure about the frictional engaging elements.

The aforementioned turbine torque estimated value Tt is decided as follows: formula (3) formula(4) formula(5)

$$e = \omega t / \omega \rightarrow e \quad (3)$$

$$Tp = C(e) \cdot (\omega e)^2 \quad (4)$$

$$Tt = \tau(e) \cdot Tp \quad (5)$$

where e means a ratio between the engine and the turbine, $\omega e$ means the engine rotational speed, C(e) means the capacity coefficient, Tp means the pump torque, and $\tau(e)$ means the torque constant. C(e) and $\tau(e)$ are decided on the basis of the experiments.

In the present embodiment, the initial value UH in the inertia phase YB is calculated on the basis of the aforementioned mathematical formula (1), and the initial value UL in the inertia phase YB is calculated on the basis of the aforementioned mathematical formula (2). In place of such, it is possible that the initial values calculated beforehand are constituted as a map and the map is housed in a memory, such as ROM, RAM, in the controller 8.

In the present embodiment, the formulas (1) to (5) exhibit an example as follows:

$$UH = 70\% \text{ (duty ratio)} = 60 + (0.1 \times 40 \text{ N-m}) + (0.002 \times 3000 \text{ rpm}) \quad (1)$$

$$UL = 30\% \text{ (duty ratio)} = 20 + (0.1 \times 40 \text{ N-m}) + (0.002 \times 3000 \text{ rpm}) \quad (2)$$

$$e = \omega t / \omega e = 3000 \text{ rpm} / 3500 \text{ rpm} \quad (3)$$

$$Tp = C(e) \cdot (\omega e)^2 = 0.5 \times 10^{-5} \times (3500 \text{ rpm})^2 = 61 \text{ Nm} \quad (4)$$

$$Tt = \tau(e) \cdot Tp = 0.65 \times 61 \text{ N} \times \text{m} = 40 \text{ N} \cdot \text{m} \quad (5)$$

Figure 6:
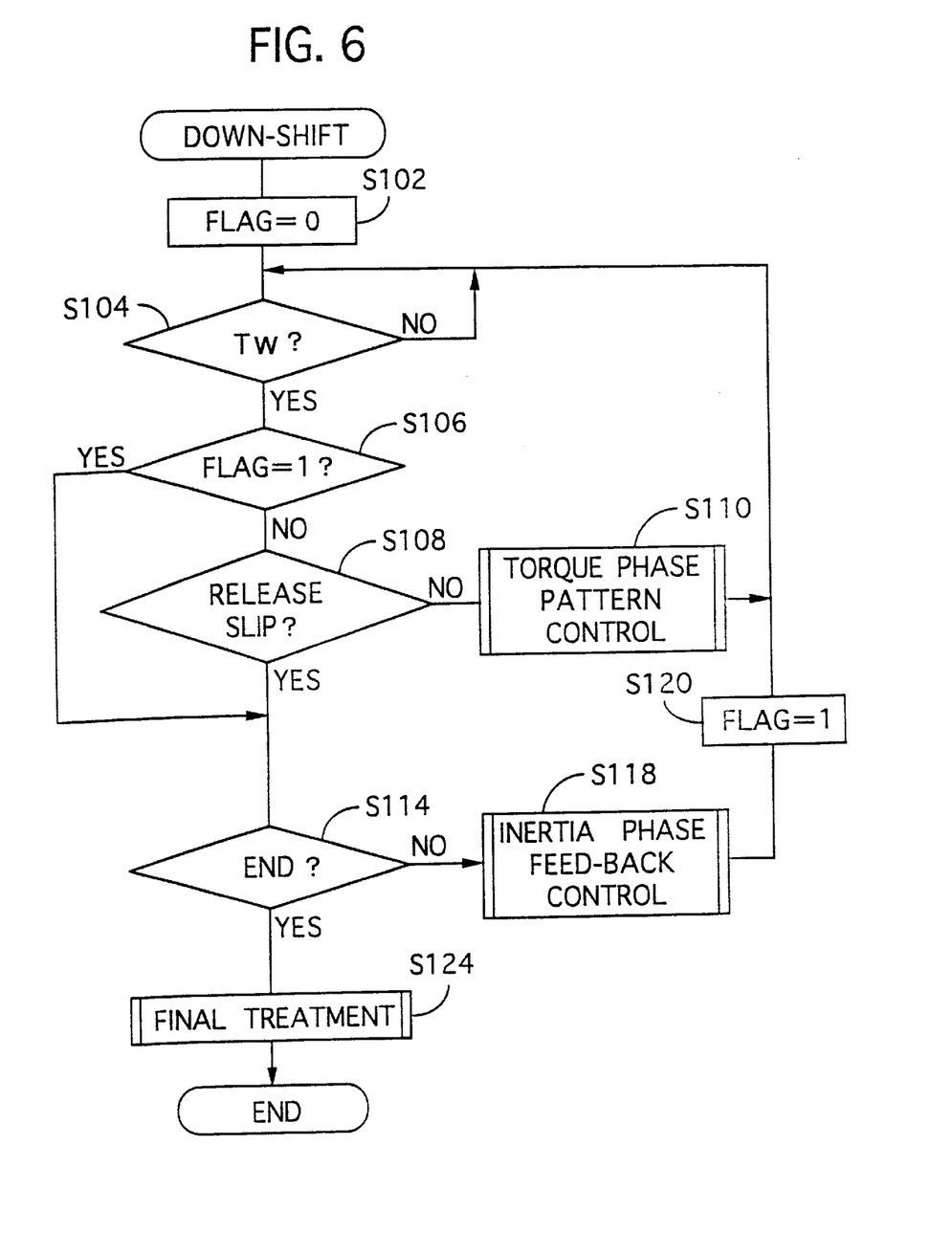

FIG. 6 is a flow chart showing the aforementioned control treatment. Selections in control are on the basis of judging flags. When the judging flag is 0, the down-shift is carried out from the high velocity step to the low velocity step. When the judging flag is 1, the inertia phase feed-back control is carried out.

Firstly, in step S102 shown in FIG. 6, the controller set the judging flag "0" for carrying out the down-shift control, the controller judges whether the predetermined time Tw (for example 10 m seconds) passes or not in step S104, and the controller waits till the predetermined time passes.

The controller 8 judges whether the juggling flag is "1"or not in step S106. Since the juggling flag is previously set at "0", the controller 8 selects "NO", progresses from step S106 to step S108, and judges whether a slip is detected in the releasing side element of frictional engaging elements or not. The controller 8 judges this slip on the basis of a change of turbine rotational speed. In the case where the slip isn't detected, the turbine rotational speed isn't in the inertia phase YB but in the torque phase YA; so, the controller 8 carries out the torque phase pattern control to returns to step S104.

In step S108, provided that the slip is detected in the releasing side element of frictional engaging elements, the phase changes from the torque phase YA to the inertia phase YB; thus, controller 8 progresses to step S118 by way of step S114 to carry out the inertia phase feed-back control.

In other words, the controller 8 controls the hydraulic command value of the releasing side element and the hydraulic command value of the engaging side element by means of feed-back control in such a target that an incline of the characteristic line A about an actual turbine rotational speed adapts to the targetted change rate S3.

The controller 8 progresses from step S118 to step S120, it sets the judging flag to "1", and return to step S104.

In step S114, when the controller 8 judges the inertia phase finished, it progresses from step S114 to step S124 to carry out the final treatment and reset of the judging flag for finishing.

Figure 7:
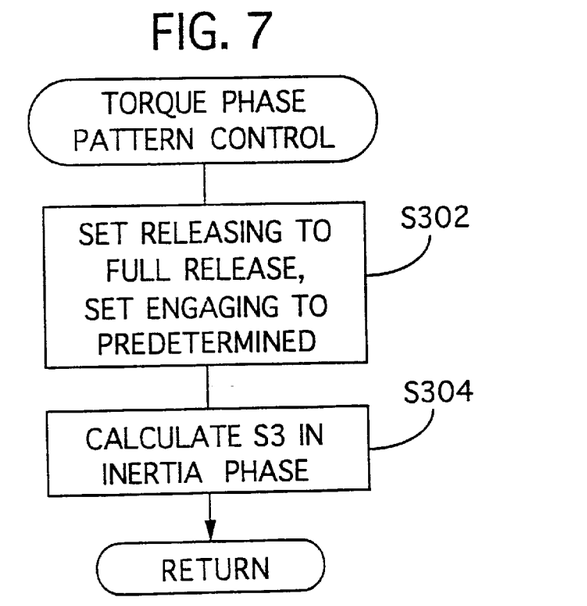
FIG. 7 is a flow chart in a torque phase pattern control.

FIG. 7 shows a flow chart of the aforementioned torque phase pattern control (step 110). In step S302, the controller 8 sets the hydraulic command value of the releasing side element to the full releasing value UO (FIG. 4(3)) so as to release the hydraulic pressure of the releasing side element, and the controller 8 sets the hydraulic command value of the engaging side element to the middle value UX (FIG. 4(4)).

In step S304, the controller 8 calculates the targetted change rate S3 of the turbine rotational speed in the inertia phase YB and returns.

Figure 8:
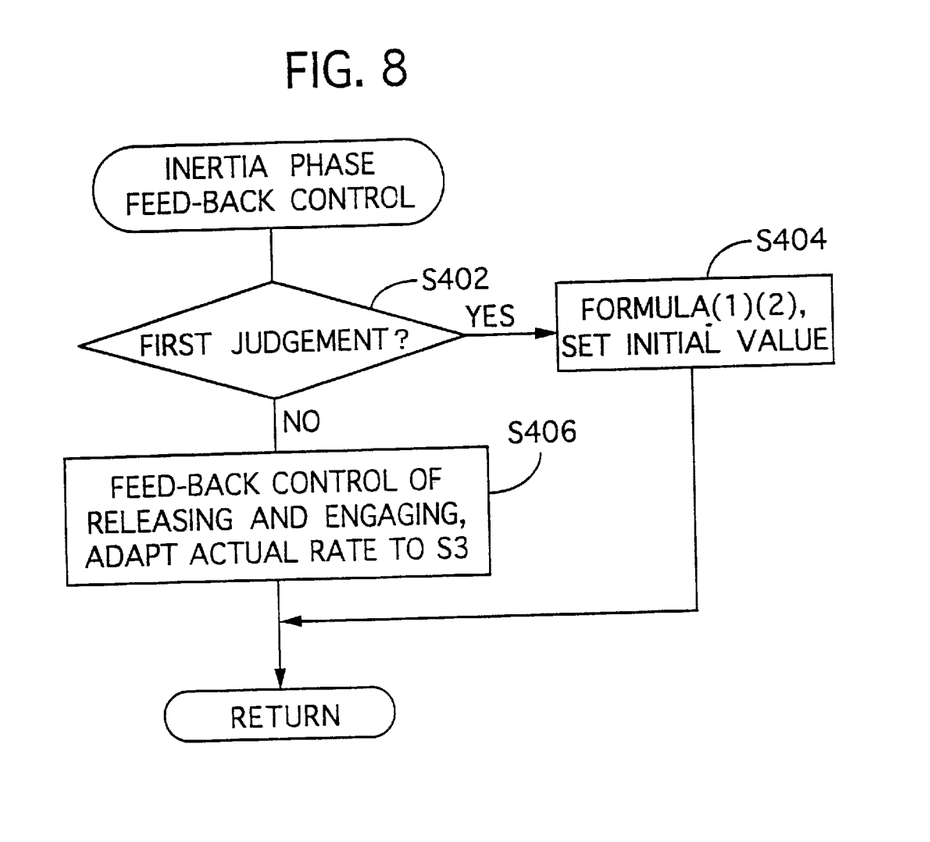
FIG. 8 is a flow chart in an inertia phase feed-back control.

FIG. 8 shows a flow chart of the inertia phase feed-back control sub-routine (step S118). In the step 402, the controller 8 judges whether this is the first judgment after detecting the slip, namely, the first judgment after the transformation into the inertia phase YB. In the case of the first judgment, the controller 8 progresses to step S404, calculates the initial value UH of hydraulic command value of the releasing side element on the basis of formula (1), the controller 8 calculates the initial value UL of hydraulic command value of the engaging side element on the basis of formula (2). Thus, the controller 8 outputs the initial value UH into the solenoid valve for generating the releasing hydraulic pressure, and it outputs the initial value UL into the solenoid valve for generating the engaging hydraulic pressure.

Unless the first judgment, the controller 8 progresses to step S406, while detecting an actual turbine rotational speed, it controls the hydraulic command value of the releasing side element and the hydraulic command value of the engaging side element by means of feed-back control, and controller 8 aims the actual change rate Sp of turbine rotational speed to the targetted change rate S3, and returns.

In the present embodiment, the control regulation (the control program), shown in FIGS. 6 to 8, is common between the power-on state and the power-off state. Namely, the control is carried out without distinguishing between the power on- state and the power-off state. Therefore, the present embodiment can reduce and avoid the problem resulting from change between the power-on state and the power-off state.

In the present embodiment, in accordance with the turbine torque and the turbine rotational speed, the controller 8 sets the engaging side initial value UL of the beginning of the inertia phase YB, and the releasing side initial value UH of the beginning of the inertia phase YB. In other words, the initial values UH and UL are set in response to actual situation of the turbine working as a torque- inputting shaft; thus, the initial values are obtained adequately. Accordingly, it is advantageously suppressed that the difference ΔA (shown in FIGS. 4,5 ) is generated between the actual change rate of turbine rotational speed and the targetted change rate S3.

Further, in the present embodiment, not only when down-shift is carried out in the power-on state, but also when down- shift is carried out in the power-off state, the controller controls the hydraulic command value of the releasing side element and the hydraulic command value of the engaging side element by means of feed- back control, in such a target that the actual change rate (an incline of the characteristic line A in FIGS. 4(1) and 5(1)) adapts to the targetted change rate S3 which is common in the releasing side element and the engaging side element.

Figure 9:
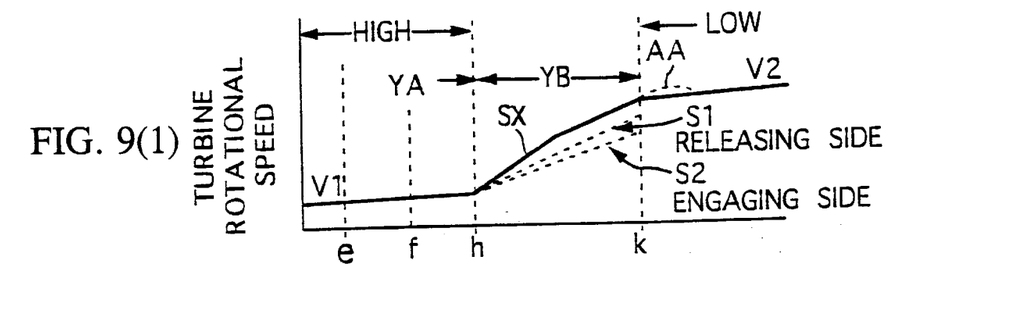

Therefore, it is easy that the hydraulic command value of the engaging side element and the hydraulic command value of the releasing side element are to be flat with the passage of time in the inertia phase YB, as compared with the case where each of the engaging side element and releasing side element respectively has the targetted change rate as shown FIG. 9.

Accordingly, it is advantageously preventable that the hydraulic pressure of the engaging side element, for moving the engaging side element of frictional engaging elements, continues to go toward the releasing direction in the closing period of the inertia phase.

As distinct from the aforementioned Japanese Unexamined Patent Publication (KOKAI) 6-11,031, it is advantageously preventable that the hydraulic pressure of the engaging side element continues to go toward the releasing direction in the closing period of the inertia phase. Thus, the apparatus of the present embodiment can advantageously prevent "a rotational blow" of turbine rotational speed in down-shift.

What is claimed is:

1. A shift control apparatus in a vehicle automatic transmission, wherein an engaging side element of frictional engaging elements is engaged to become a low-velocity step by a hydraulic pressure of said engaging side element, while a releasing side element of said frictional engaging elements engaged in a high velocity step is released by a hydraulic pressure of said releasing side element, so as to carry out a down-shift in such a manner that a turbine rotational speed increases to generate an inertia phase, and the apparatus comprising:

a flatness-aiming means having a common targetted change rate with respect to said turbine rotational speed in the inertia phase, said common targetted change rate being targetted in said engaging side element of said frictional engaging elements and in said releasing side element of said frictional engaging elements, for feedback controlling said releasing side element and said engaging side element of said frictional engaging elements in such a target that motion of said engaging side element of said frictional engaging elements and motion of said releasing side element of said frictional engaging elements in said inertia phase adapt to said common targetted change rate, and for aiming a hydraulic command value of said engaging side element and a hydraulic command value of said releasing side element at flatness in said inertia phase with the passage of time; and an initial value setting means for setting an engaging side initial value and a releasing side initial value in said inertia phase, in response to a physical amount about a turbine torque and in response to a physical amount about said turbine rotational speed, wherein said engaging side initial value is the hydraulic command value for moving said engaging side element of said frictional engaging elements, and wherein said releasing side initial value is the hydraulic command value for moving said releasing side element of said frictional engaging elements.

2. A shift control apparatus in a vehicle automatic transmission according to claim 1, when said turbine rotational speed is changed from a torque phase to said inertia phase, said initial value setting means sets said engaging side initial value at a beginning of said inertia phase, and said initial value setting means sets said releasing side initial value at the beginning of said inertia phase, on the basis of said turbine torque and said turbine rotational speed at a finishing region of said torque phase.

3. shift control apparatus in a vehicle automatic transmission according to claim 1, wherein said shifting control apparatus has a common control regulation to be carried out distinguishing between a power-on state in which an accelerator pedal is depressed and a power-off state in which said accelerator pedal is not depressed.

4. A shift control apparatus in a vehicle automatic transmission according to claim 1, wherein a slip signal with respect to said releasing side element of said frictional engaging elements is inputted into said shift control apparatus;

when said slip signal is inputted into said shift control apparatus, said shift control apparatus carries out an inertia phase feedback control which aims motion of said engaging side element of said frictional engaging elements and motion of said releasing side element of said frictional engaging elements at said the common targetted change rate.

5. A shift control apparatus in a vehicle automatic transmission according to claim 4, when said slip signal is not inputted into said shift control apparatus, said shift control apparatus carries out a torque phase pattern control;

in said torque phase pattern control, a hydraulic command value of said releasing side element is set as a full releasing value, and a hydraulic command value of said engaging side element is set as a middle value between the full releasing value and a full supplying value.

6. A shift control apparatus in a vehicle automatic transmission according to claim 1, wherein said turbine rotational speed is increased in said inertia phase with the passage of time.

7. A shift control apparatus in a vehicle automatic transmission according to claim 1, wherein said releasing side initial value is set as UH, and said engaging side initial value is set as UL, said UH is decided on the basis of the following mathematical formula (1), and said UL is decided on the basis of the following mathematical formula (2);

$$UH = aH + (bH \times |Tt|) + (cH \times \omega t) \qquad (1)$$

$$UL = aL + (bL \times |Tt|) + (cL \times \omega t); \qquad (2)$$

where aH,bH,cH,aL,bL,cL are constant coefficients, $\omega t$ is a turbine torque estimated value, and Tt is a turbine torque estimated value.

8. A shift control apparatus in a vehicle automatic transmission according to claim 7, wherein said turbine torque estimated value Tt is decided as follows: formula (3)→formula(4)→formula(5)

$$e = \omega t / \omega e \qquad (3)$$

$$Tp = C(e) \cdot (\omega e)^2 \qquad (4)$$

$$Tt = \tau(e) \cdot Tp \qquad (5)$$

where to $\omega e$ is the engine rotational speed, $C(e)$ is the capacity coefficient, Tp is the pump torque, and $\tau(e)$ is the torque constant.

* * * * *